United States Patent

Hanen

Patent Number: 5,161,281
Date of Patent: Nov. 10, 1992

[54] WHEEL RIM CLEANING APPARATUS

[76] Inventor: Harry I. Hanen, Box 12, Site 7, SS #3, Springbank, Alberta, Canada, T3G 3N9

[21] Appl. No.: 567,171

[22] Filed: Aug. 14, 1990

[51] Int. Cl.$^5$ .............................................. A47L 25/00
[52] U.S. Cl. ..................................... 15/88.3; 15/88.4; 74/527; 403/328; 403/355
[58] Field of Search ...................... 15/88.3, 88.4, 88.2, 15/21.1; 51/168, 334, 47,48 R, 50 R, 51, 105 R, 106 R; 74/527; 403/328, 355, 356

[56] References Cited

U.S. PATENT DOCUMENTS

| | | | |
|---|---|---|---|
| 1,861,903 | 6/1932 | Bellando | 15/88.3 |
| 2,009,371 | 7/1935 | Jurge | 403/328 |
| 2,150,462 | 3/1939 | Schultz et al. | |
| 2,154,971 | 4/1939 | Bruni | 51/168 |
| 2,287,725 | 6/1942 | Conte | 403/328 |
| 2,290,215 | 7/1942 | Stenberg | 51/168 X |
| 2,307,386 | 1/1943 | Braxton | 51/168 |
| 2,807,038 | 9/1957 | Henry | |
| 2,851,295 | 9/1958 | Chaffee | 403/328 |
| 3,024,483 | 3/1962 | Brauer | 15/88.3 |
| 3,638,352 | 2/1972 | Christiansen | 403/355 |
| 4,009,499 | 3/1977 | Casler et al. | 15/88.3 |
| 4,426,747 | 1/1984 | Mola et al. | 15/88.3 |
| 4,527,300 | 7/1985 | Kunde et al. | 15/88.3 |
| 4,532,665 | 8/1985 | Evans et al. | 15/88.3 |

FOREIGN PATENT DOCUMENTS 0775434  11/1980  U.S.S.R. .............. 403/355

*Primary Examiner*—Harvey C. Hornsby
*Assistant Examiner*—Tony Soohoo
*Attorney, Agent, or Firm*—Kerkam, Stowell, Kondracki & Clarke

[57] ABSTRACT

An apparatus for cleaning the rim of a vehicle which including a buffer wheel head mounted adjacent a wheel mounting device and being pivotable toward the rim about a first axis which is parallel to the axis of rotation of the wheel. The buffer wheel head includes a pair of buffer wheel mounted on a drive shaft in the buffer wheel head, at least one of the buffer wheels being axially adjustable on the shaft so that the pair of buffer wheels can be positioned immediately within the side flanges of the rim. The head is pivotally about another axis spaced from and perpendicular to the first axis so as to allow the pair of buffer wheels to swivel to turn the buffer wheels at a slight angle relative to the side flanges first to one side and then to the other to thereby simultaneous engage both flanges with an enhanced buffing action. The wheel mounting structure allows for quick adjustment of one or both buffer wheels and includes a hub slidable received on the drive shaft which includes an elonaged channel with a fluted side formed by a plurality of recesses, and a series of indents including axial of the shaft as well. The hub has a pin member which projects into central bore thereof and extends into the channel and a spring loaded ball which also projects into the bore and is received on one indent at a time so as to position hub in one of a series of settings. When torque is transmitted between the shaft and hub, the pin engages one of the recesses in the side of the channel to lock the hub against axial movement during the buffing action.

17 Claims, 8 Drawing Sheets

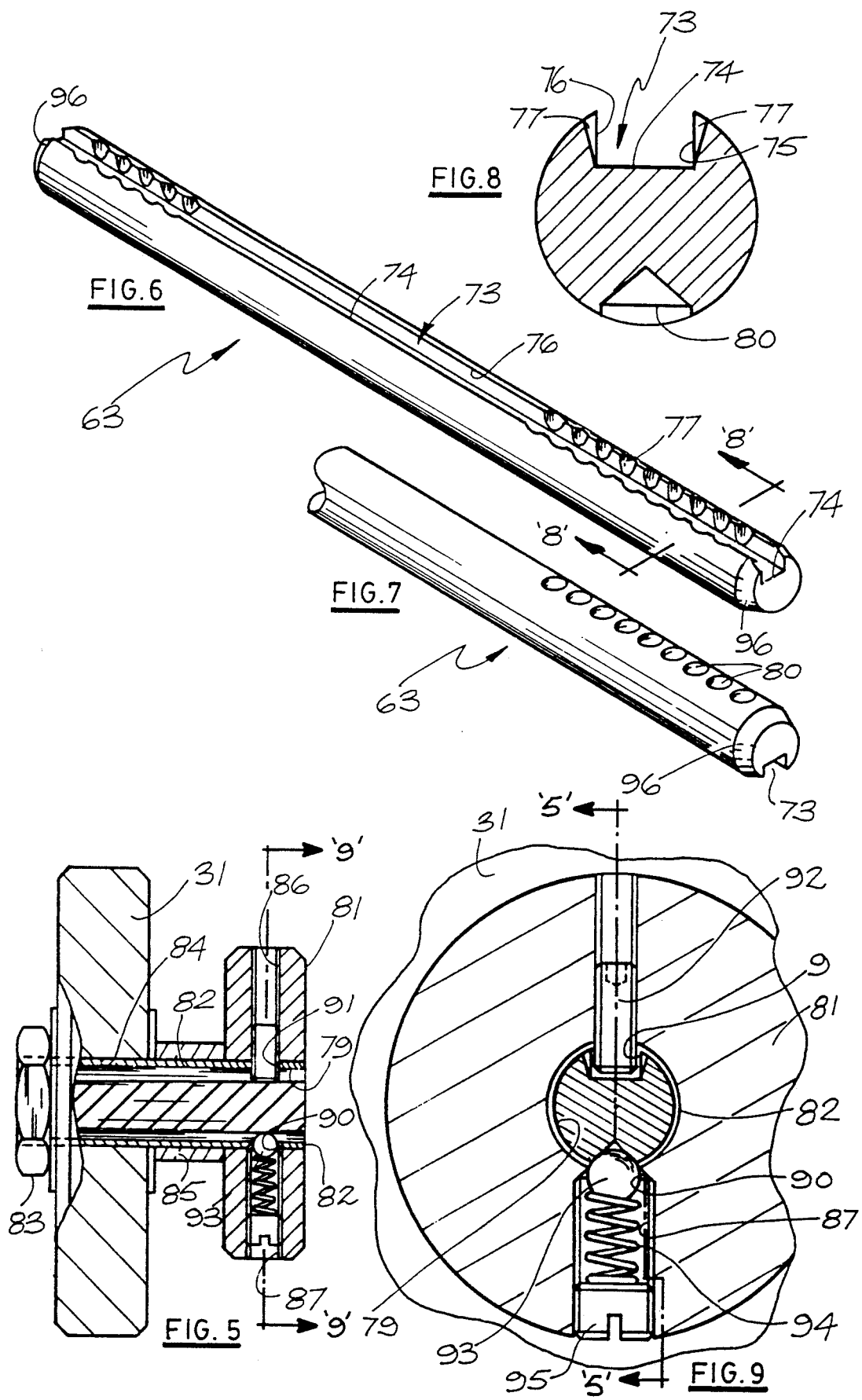

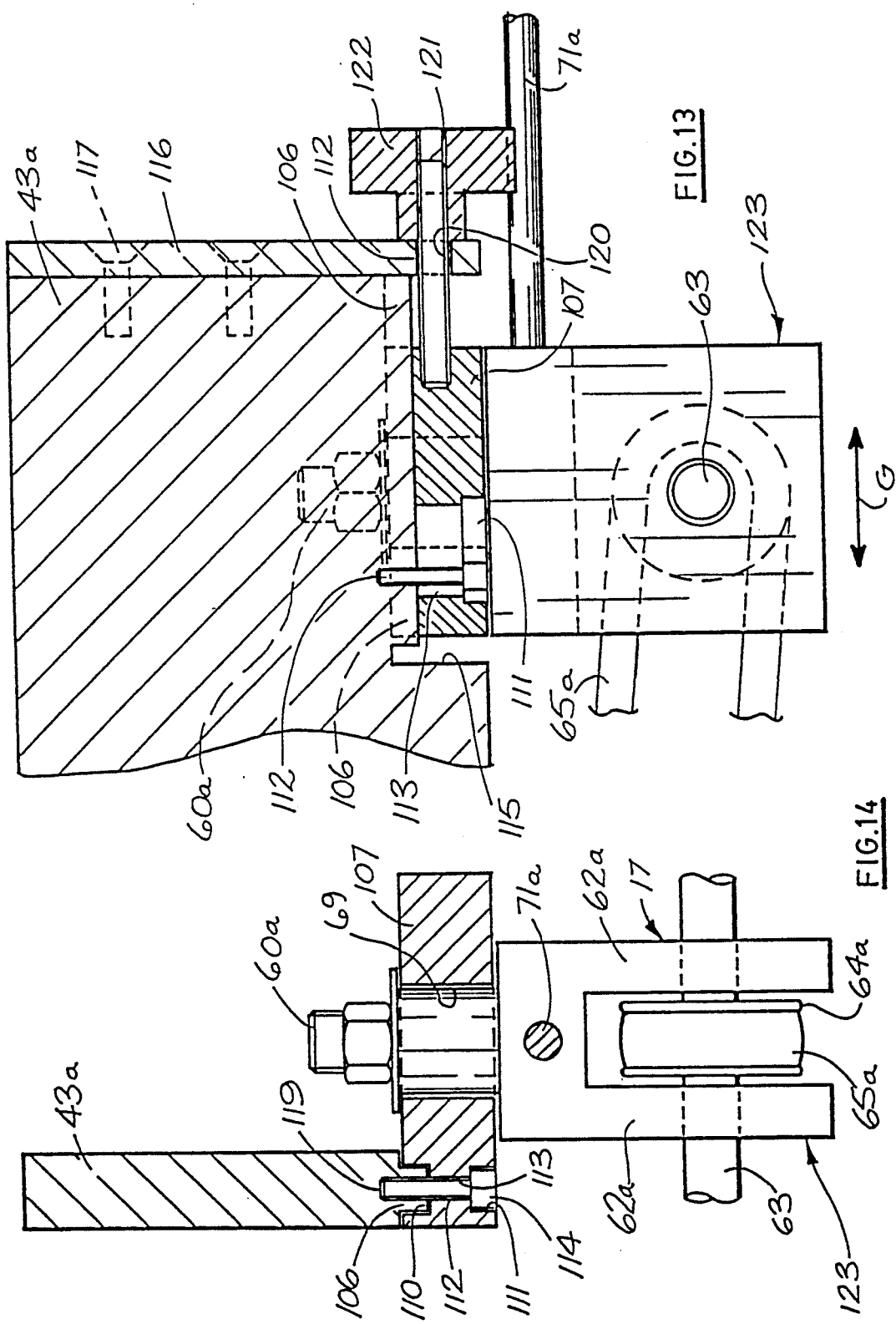

WHEEL RIM CLEANING APPARATUS

BACKGROUND OF THE INVENTION

1. FIELD OF THE INVENTION

This invention relates to a rim cleaning apparatus of a type for buffing the bead sealing portions of a vehicle wheel rim on which a tire is mounted.

Pneumatic tires are commonly mounted on wheels having a rim section in the form of a pair of side flanges defining opposed inner side surfaces forming the seat for the beads of the tire. After extended use, the interior surface of the rim, and particularly the areas immediately inwardly of the outer edges of the flanges which seat the tire beads, becomes dirty and rough due to infiltration of moisture and debris between the beads of the tire and the flanges of the rim. While the interior surfaces of the rim are initially made smooth so as to ensure a good seating of the tire beads, by the time it becomes necessary to remove the tire for maintenance or replacement, the lack of smoothness, which may be due mainly to rust, prevents the beads of the repaired or new tire from sealing, and as a result, the tire may not be capable of maintaining it's inflated pressure. As a result, it is necessary, or at least a good practice in tire maintenance, to clean the interior surface of the rim when a tire has been removed.

2. Description of the Prior Art

The most common practice for cleaning the rim is to use a hand wire brush, but because much the rust and dirt may be difficult to remove completely with a hand brush, the cleaning may not thoroughly prevent eventual sealing problems. As an alternative to the hand brush, it is also a common practice to use a hand powered tool of the type having a rotating wire brush. This approach is also time consuming, and as it becomes rather tedious ensuring that the brush is properly held so that even the interior concave corner is cleaned entirely around both flanges of the rim, the cleaning operation is often not carried out to completion. When the roughness is severe and possibly involving pocking of the surface, due to rust, the rim may be taken to a stationary grinding wheel on which a wire brush or special buffer wheel is mounted. Normally with this arrangement, however, it is necessary for the operator to hold the wheel and to maneuver it by hand so as to present the proper surfaces to the buffer wheel. This is difficult not only because of the weight of the wheel, but because of the size and shape of the wheel, the operator does not have a good view of the area being cleaned. With large wheels it is, of course, substantially impossible to handle the wheel manually for this type of cleaning.

Some specialized wheel cleaning machines have been developed, but have not been found to be entirely satisfactory. As a result, previously developed specialized machines have not been generally accepted in the industry. The machines, some of which are relatively complex, and therefore expensive, have either not been capable of doing a thorough cleaning job or they are not sufficiently versatile to operate satisfactory on all of the various shapes and sizes of wheels now used. While attempts have been made to include various means for allowing adjustments to the machine so as to accommodate the various wheel sizes and designs, such means may require more time to make the adjustment than the machine operator may wish to take. Even if such a machine would be provided, there would be a temptation for the mechanic to quickly wire brush the rim by hand rather than taking it to a separate area and then carrying out the required machine adjustments and rim mounting steps.

In U.S. Pat. No. 2,807,038 to Henry and U.S. Pat. No. 2,150,462 to Schultz et al, there are shown rim finishing and rim cleaning machines wherein cleaning wheels are mounted for rotation on shafts parallel to the axis rotation of the rim to be cleaned. Shafts of the cleaning or buffing wheels are movable toward the rim, while remaining parallel to the axis of rotation of the rim. Schultz et al shows the use of one wire brush which is shaped to enter the rim and is detachably secured to the rim for the application of the brush best adapted for use with a particular rim. Henry shows a use of two buffing wheels mounted on a common power shaft and attached by way of set screws so that the spacing can be adjusted. With such arrangements, unless the wheels are correctly shaped for the profile of the rim and are accurately located, the various curved and grooved portions of the rim may not be thoroughly buffed during the cleaning operation.

U.S. Pat. No. 4,727,300 to Kunde et al shows a machine wherein the rim is clamped in a conventional tire changing machine with a buffing assembly attached to a cross tube which orbits the buffing assembly about the periphery of the rim as a cross bar is rotated. The buffing assembly is pivotable about axis parallel to the axis of orbit so as to be movable into contact with the rim. Two brushes are mounted on a common shaft by way of an elaborate wheel mounting means allowing the axial positioning of the pair of brush wheels as a unit. The mounting means together with a rim engaging roller are adjusted to provide an axial thrust on the brush wheels.

U.S. Pat. No. 4,426,747 to Mola et al and U.S. Pat. No. 4,532,665 to Evans et al relate to a brush assembly which includes a single buffing brush mounted on a power shaft parallel to the axis of rotation of the wheel. The brushing assembly is carried on a mounting arrangement which is pivoted to move the buffing brushes toward the rim. In U.S. Pat. No. 4,426,747, the brush wheel can be shifted axially and the wheel rim, includes a pivotable arrangement so as to turn the axis of the wheel relative to that of the shaft of the buffing brush to thereby assist in the brush in buffing otherwise unreached parts of the rim. In U.S. Pat. No. 4,532,665, the assembly which mounts the motor and the single buffer wheel can turn so as to allow the axis of the buffer wheel to turn relative to the axis of rotation of the rim. As in the structure of Mola et al, because only one buffing wheel can be used in such a structure, it is necessary to perform a separate cleaning steps for each side flange of the rim, and in the structure of Evans et al, the assembly mounting the motor and buffer wheel assembly is mounted for swiveling relative to the axis of rotation of the wheel.

SUMMARY OF THE INVENTION

It is an object of the present invention to provide a relatively simply, and thus inexpensive apparatus for effectively cleaning the interior flanges of a tire rim simultaneously. It is a further object of the present invention to provide an apparatus which requires a minimum of adjustment time for accommodating wheels of different sizes and shape.

According to one aspect of the present invention, there is provided a buffing device for simultaneously cleaning a pair of axially spaced wheel flanges of a conventional tire receiving vehicle wheel, the device including an assembly having means for mounting of the device adjacent a wheel rotating device means which rotates the wheel about its axis. The device includes an arm member connected at an inner end by a first pivot means to the mounting means, and a head means connected by second pivot means to an outer end of said arm member. A shaft is mounted in bearing means carried by said head means and a pair of buffer wheels is mounted on the shaft for rotation with said shaft about an axis of said shaft. Wheel mounting means affixes the wheels to the shaft for rotation therewith and permits selective adjustment of at least one of the wheels axially along the shaft to alter their relative axial location on the shaft. The first pivot means mounting the arm has a pivot axis substantially parallel to the axis of rotation of the vehicle wheel for allowing movement of the head member toward and away from the outer rim of the vehicle wheel. The second pivot means has an axis perpendicular to the axis of the first pivot means for permitting swivel motion of the buffer wheel shaft in a plane parallel to the axis of rotation of the vehicle wheel. Motor means is mounted on the assembly and drive means is connected between the motor means and the shaft for rotating the buffer wheel shaft. Manually operable means is connected to the head means for controlling the swivel motion of the head member so that the buffer wheels are turned at an angle relative to the flanges on rotatable engagement with inside faces of the vehicle wheel.

As will become more apparent below, when the buffer wheels are adjusted so the one each will be adjacent an inside surface of the rim flanges and the head means is swung to position the buffer wheels in a rim cleaning position, the swiveling of the head from one side to the other, causes the buffer wheels to pass over the surfaces of the rim from opposite directions and at different angles of approach which results in a thorough cleaning operation.

According to another aspect of the invention there is provided an assembly for mounting a hub on an elongated shaft of circular cross section for permitting axial positioning of the hub along the shaft and for affixing the hub against both rotation of the hub and axial movement thereof on the shaft during driving rotation between the shaft and the hub. The hub has an axial bore for longitudinal sliding reception of the shaft therethrough, the shaft having a channel extending axially an extent over which the hub is axially positionable. The shaft further defines along an axially extending line displaced circumferentially about the shaft from the channel a series of axial spaced indents. The hub has an indexing member biased radially into the bore and shaped to be received in each indent for providing limited resistance against relative and circumferential movement between the hub and the shaft during a non-driving condition. The hub has a rigid detent projecting radially into the bore for sliding reception longitudinally of the channel as the indexing member is moved from one indent to the next The channel is defined by a pair of side walls, at least one side wall of the channel being fluted along the length thereof by way of a series of recesses having an axial spacing corresponding to the spacing of the indents and shaped to receive the detent upon a slight circumferential shift of the hub as the shaft is rotated to transmit a torque therebetween.

The above described assembly, when utilized as a mounting for the buffer wheels on their drive shaft, allows for the axial adjustment of one buffer wheel relative to the other, or preferably axial adjustment of both buffer wheels by simply pushing the buffer wheels by hand until they are properly positioned in relation to the flanges of the particular rim involved. No tools are required and the adjustment of both wheels can be made within a second or two. Once the motor is started to turn the drive shaft of the buffer wheels, the buffer wheel mounting assembly automatically locks the buffer wheels at their settings in a manner which prevents any axially or circumferential movement for the magnitude of forces encountered in the cleaning operation.

BRIEF DESCRIPTION OF THE DRAWINGS

In the accompanying drawings, which show embodiments of the invention as examples.

FIG. 5 is a cross-sectional view through a hub assembly as seen from the line 5—5 of FIG. 9 but separate from the drive shaft.

FIG. 6 is a perspective view of a shaft of the type for use with the hub assembly of FIG. 5;

FIG. 7 is a partial perspective view of the shaft as shown in FIG. 6 but as seen from the opposite side;

FIG. 8 is a cross-sectional view through the shaft of FIGS. 6 and 7 as seen from the line 8—8 of FIG. 6;

FIG. 9 is a cross-sectional view through the hub assembly of FIG. 5 but showing the hub assembly mounted on a shaft of the type shown in FIG. 6 to 8;

FIG. 13 is a side view of the head assembly of the apparatus of FIGS. 11 and 12, partially in cross-section, and on an enlarged scale;

FIG. 14 is a cross-sectional view as seen from the line 14—14 of FIG. 13.

DESCRIPTION OF PREFERRED EMBODIMENTS

Figure 1:
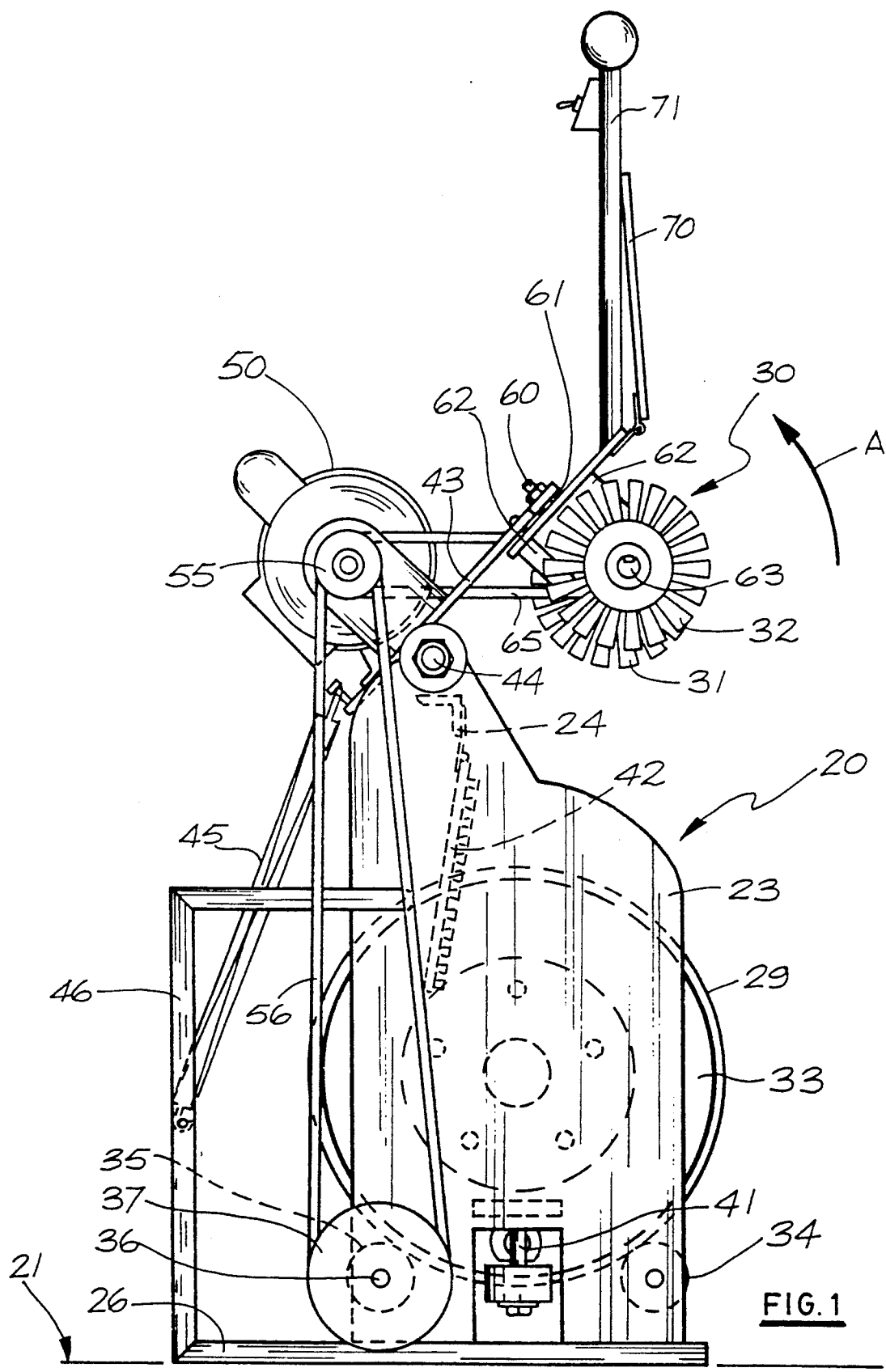
FIG. 1 is a side view of one embodiment of the rim cleaning apparatus of the present invention.
Figure 2:
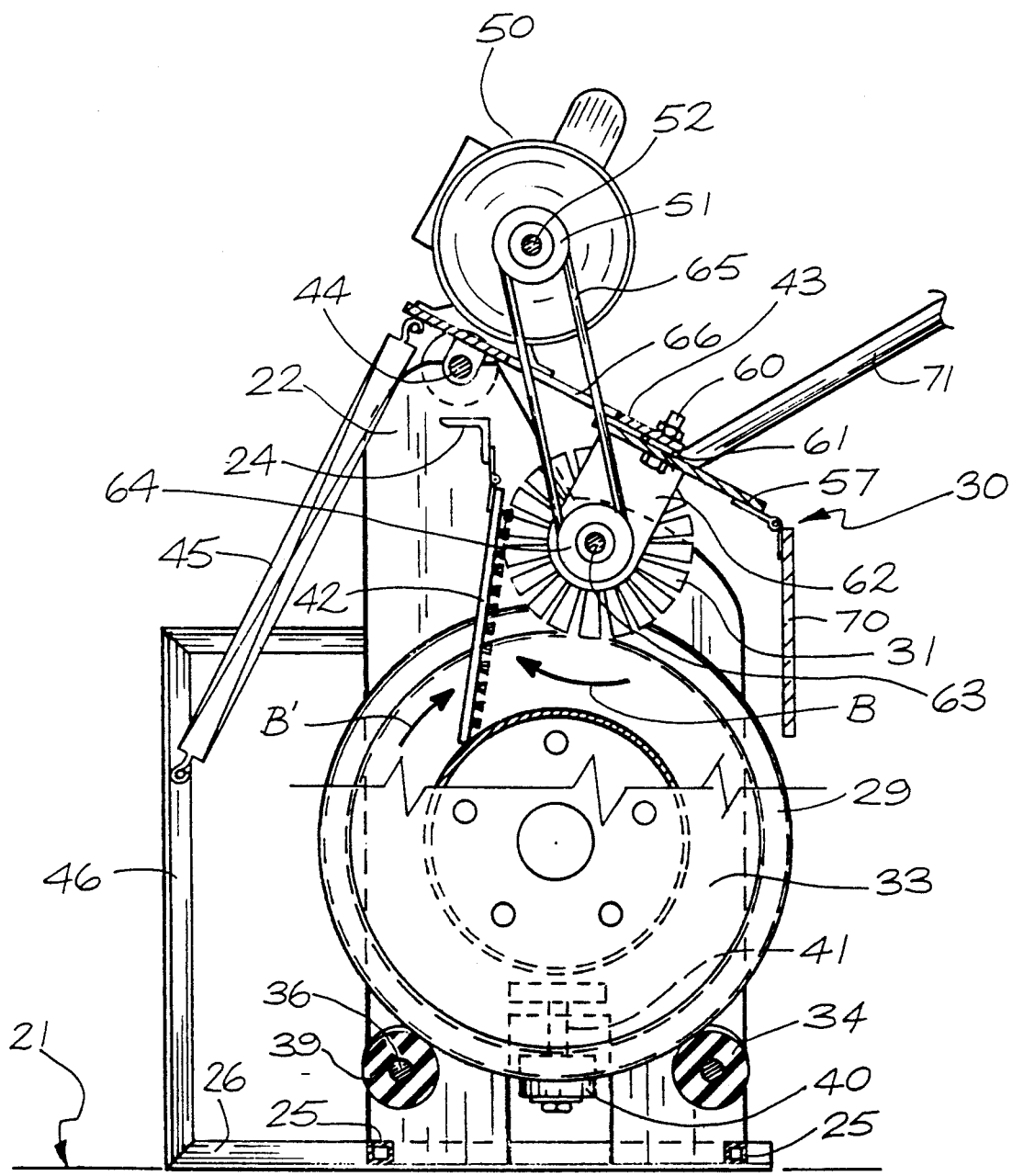
FIG. 2 is a cross-sectional view through the apparatus of FIG. 1 as seen from the lines 2—2 in FIG. 3.
Figure 3:
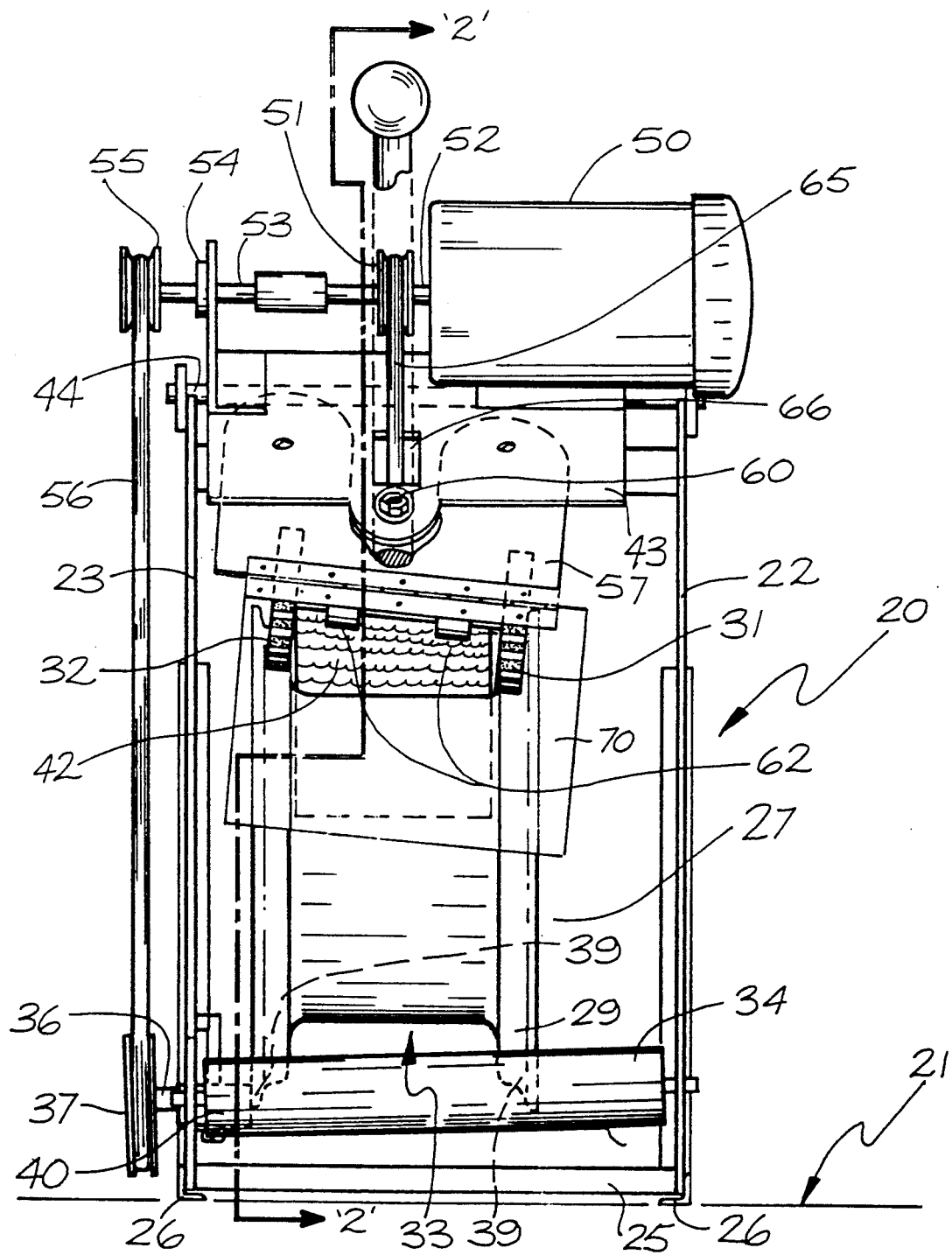
FIG. 3 is a front view of the apparatus shown in FIG. 1.

In FIGS. 1 to 3, the reference character 20 generally denotes one embodiment of the apparatus of the present invention. The apparatus 20 is of the type which may be installed, for example, in the area of a vehicle repair shop dedicated to wheel and tire maintenance, or in a shop specializing in tire sales and maintenance. The apparatus 20, which is designed to sit directly on the floor 21 may preferably be installed immediately beside one or more of the conventional tire changing machines. The apparatus has a frame structure which includes separate side plates 22 and 23 joined by an upper transverse frame member 24 in the form of an angle iron and two lower transverse frame members 25 which are shown in the form of elongated steel members of box shaped cross-section. The lower edges of the side plates 22 and 23 are affixed, such as be welding, to longitudinally extending side frame members 26. The side frame members 26 extend rearwardly from the side plates 22 and 23 and support a rear external framework 46. As is readily apparent from FIG. 3, the side plates 22 and 23 are spaced so as to provide a wheel receiving area 27 therebetween (FIG. 3). A head assembly 30, which includes a pair of driven buffer wheels 31 and 32 is mounted at the top of the frame structure and is moveable, as will be described in more detail below, into engagement with a rim 29 of a wheel 33 mounted in the wheel receiving area 27. The buffer wheels 31 and 32 may be in the form of wire brush wheels or wheels formed of various buffing materials now commercially available.

The wheel receiving area 27 is provided with a wheel mounting means including a pair of transverse spaced support rollers 34 and 35. The wheel receiving area 27 is sufficiently large, of course, to receive rims of various sizes. It is possible that the overall apparatus may be produced in different sizes, so as to make it possible, for example, to service very large vehicle wheels, such as those used on trucks, while smaller models could be made available which would accept wheels of the variety of sizes used on automobiles. The rollers 34 and 35 are parallel and spaced in the longitudinal direction of the machine sufficiently that they support a wheel 33 at points on the periphery of the rim 29 which are well spaced so that there is no tendency for the wheel, once placed between the rollers 34 and 35, to roll out of the wheel receiving area when it is being rotated during the cleaning operation. The rollers 34 and 35 have a length to extend substantially between the side plates 22 and 23 and may be journalled on shafts affixed to the side plates for free rotation. However, in the embodiment illustrated in FIGS. 1 to 3, the rear roller 35 is affixed to a shaft 36 which is driven by a pulley 37 so that on rotation of the shaft 37, the rear roller 35 is rotated for driving the wheel as will be described in more detail below. Both rollers 34 and 35 are mounted with a slight slope, the end of each rollers at the left hand side of the apparatus, as seen in FIG. 3, being lower than the end at the right hand end. Thus, as rotation of the wheel commences, there is a tendency for the wheel to travel to the left hand side of the apparatus due to the slope of the rollers 34 and 35. A guide roller 40 which is journalled on a vertical shaft 41 is disposed between rollers 34 and 35, and the periphery of the roller 40 is positioned to engage the side of the flange of the rim so as to position the left hand side of the rim 29 as seen in FIG. 3. A heavy plate member 42 is hingedly connected to the transverse frame member 24 and normally hangs vertically into the wheel receiving area 27. The plate has a width which allows the plate to be received between outer flanges 39,39 of the rim 29 and is preferably tapered towards the lower end. As a wheel is rolled into a position supported by the rollers 34 and 35, it engages the heavy plate so as to bring the rim to a stop as it passes over the front roller 34 and engages the rear roller 35. As the heavy plate is tapered, it seats between the flanges 39,39 and also tends to prevent the rim from wobbling or moving away from the guide roller 40 as the buffing operation is carried out.

The head assembly 30 is mounted on arms means or head assembly mounting plate 43 which is supported at its rear end by a pivot shaft 44. The pivot shaft 44 extends across the full width of the apparatus between the side plates 22 and 23. The head assembly mounting plate 43 extends behind the axis of the pivot shaft 44 and has connected thereto a relatively heavy tension spring 45 which is connected to the framework 46 at a point below and rearwardly of the shaft 44 so as to apply a biasing force pivoting the portion of the head assembly mounting plate forward of the shaft 44 in an upward direction as indicated by the arrow A to the inoperative position shown in FIG. 1.

A wheel drive motor 50 is mounted on a rear portion of the head assembly mounting plate and is preferably positioned substantially above the pivot shaft 44 so as to have little effect on the balancing of the head assembly mounting plate as the plate is moved between a lowered operative position as shown in FIG. 2 to the raised inoperative position as indicated in FIG. 1. A drive pulley 51 is mounted on an output shaft 52 of the motor 50. The output shaft 52 is provided with an extension shaft 53 extending through a bearing 54 mounted on the side plate 53. An end portion of the extension shaft 53, which projects through the plate 23 has a drive pulley 55 mounted thereon. A drive belt 56 encircles pulleys 54 and 37 so as to provide the driving rotational power to the rear roller 35 which forms part of the rim mounting means of the wheel.

The head assembly 30 includes a mounting plate 57 which is connected to the head assembly mounting plate 43 by way of a shaft 60 shown in the form of a bolt and nut assembly and including a bearing means 61 which allows the mounting plate 57 to swivel about the axis of shaft 60, the axis of shaft 60 is extends at right angles to the pivot axis of the shaft 44 and is spaced forwardly therefrom. Affixed to a lower face of the mounting plate 57 and projecting therebelow is a pair of bearing support members 62. The bearing supports 62 are provided with openings (not shown) in which a buffer wheel drive shaft 63 is rotatably mounted. A pulley 64 (FIG. 2) is secured to the buffer wheel drive shaft 63 between the bearing support members 62. A drive belt 65 which encircles the pulley 55 and the pulley 64 provides drive between the motor 50 and the shaft 63. The drive belt 65 extends through an opening 66 in the mounting plate 57. The buffer wheels 32 and 33, which are provided with hub mounting means 72 allowing for axial positioning of the buffer wheels on drive shaft 63, are located outside of the support members 62.

Figure 4:
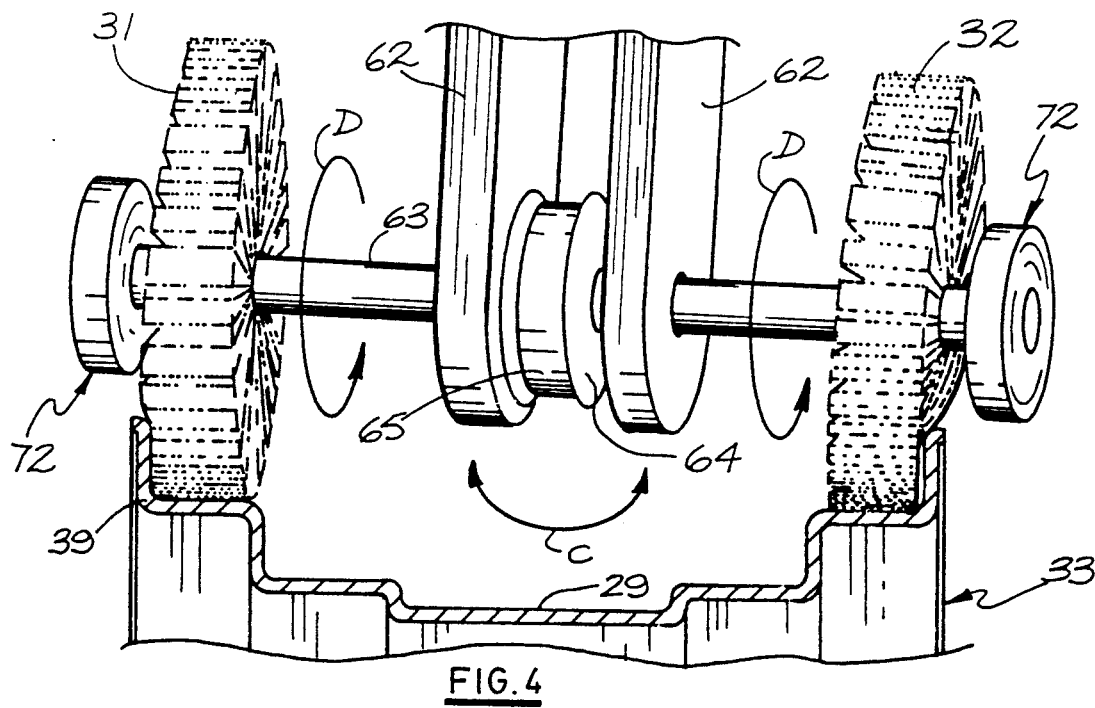
FIG. 4 is a cross-sectional view through a rim showing the relationship of the buffing brushes engaging within the flanges of the rim.

A sheet of transparent shatter-resistant material which is hingedly connected along its upper edge to the mounting plate provides a visual guard 70 in front of the buffing wheels. Manual operable means in the form of an operator's control handle 71 is affixed at an inner end to the forward edge from at a slightly upward angle when the head assembly 30 is in its lowered operative position (FIG. 2). An electric switch 72 is mounted near the outer end of the handle and is wired to the motor 50 so that when the wheel 33 has been inserted into its cleaning position in the rim receiving area 27 and the necessary adjustments made to the positions of the buffer wheels. The operator can grasp the operating handle 71 to pull the buffer wheels down into a rim engaging position, this action causing the stretching of the tension spring 45. The visual guard 70 is then lowered to a position in front of the buffer wheels. After lowering the head assembly towards its rim engaging position, the position of the buffer wheels on the shaft are adjusted so that they enter the rim portion of the wheel immediately inside of the flanges 39,39. The operator may then turn the switch 72 to an on position which causes activation of the motor 50 so that the buffer wheels are driven by way of belt 64. As viewed in FIG. 2, the buffer wheels rotate in the direction of the arrow B. At the same time, the rim is also rotated in a clockwise position as indicated by the arrow B' in FIG. 2 due to the drive transmitted to the rear roller 35 through the drive belt 56. Once the buffer wheels are rotating, the lever 71 is pushed to one side and then to the other as the rim, which is rotating at a relatively slow speed as compared to the rotational speed of the buffer brushes. The wheel 33 is allowed to turn through several rotations. As will be described in more detail below, as the handle 71 is shifted from one side to the other, the buffer wheel head assembly is swivelled within the rim as indicated by the arrow C so that the buffer wheels are at a slight angle relative to the side flanges 39,39 of the rim (FIG. 4). When the buffer wheels 31 and 32 are at an angle and are rotating in the direction of arrows D,D in FIG. 4, the buffer wheel 31 on one side carries out a scrubbing action as it passes over the flange 39 going in a downwardly direction while the opposite buffer wheel 32 engages the opposite flange 39 as the buffer wheel leaves the buffing zone. This effect provides exceptionally good buffing action and compensates for any profile of the buffer wheel which would not enter a portion of the rim profile if the buffer wheels are rotating in a straight ahead position. For example, the corner of the buffer wheel may not match in shape the corner formed between the flange 39 and the cylindrical shaped portion of the rim immediately adjacent thereto. However, as brush 31 rotates in the direction D shown in FIG. 4, it has a tendency to attempt to climb up onto rim 39 and it thus provides an enhanced scrubbing action which also causes some deformation of the buffer wheel so as to be forced into the sharper corner portions Buffer wheel 32 experiences a somewhat opposite action in that it tends to climb downwardly of the flange, causing some deformation of the brush over the top edge of the flange 39 so as to enhance the scrubbing action in that area. When the assembly head is swivelled in the opposite direction as indicated by arrow C, then the flange 39 shown on the right of FIG. 4 experiences the same type of scrubbing action as was previously experienced by the flange 39 on the left hand side and vice versa.

As indicated above, the buffer wheels 31 and 32 are provided with a hub mounting means or assembly 72 which permits quick axial adjustment of the buffer wheels 31 and 32 into the appropriate buffing positions for any particular wheel being cleaned. In the embodiment shown in FIGS. 1 to 3, it is not essential that both wheels 31 and 32 be adjustable axially along the drive shaft 63 because in this embodiment, the position of the side flange 39 on the left hand side as viewed in FIG. 3 of all wheels positioned within the rim receiving area 27 will be approximately the same because of its engagement with the roller 40. In any event, as will be apparent from the description below, it is possibly, with very little extra cost, to provide the hub mounting means 72 so as to allow axial adjustment of both buffer wheels 31 and 32 and also make it possible to interchange the two wheels as will also be readily apparent from the description below. With the novel interacting means formed on the hub mounting means 72, the buffer wheels 31 and 32 can be removed completely from the shaft and replaced with buffer wheels of a different type, depending on the shape and the addition of the rim to be cleaned.

As described above, a drive shaft 63 is mounted for rotation in support members 62. A pulley 64 is affixed to the shaft of the type 63 shown in FIGS. 6 and 7 for driving the shaft 63 in the direction of the arrows D,D. The shaft has a channel 73 (FIG. 6) extending axially the full length of the shaft. The channel 73 may be a rectangular shape like a normal key-way channel, the rectangular shape being defined by a bottom wall surface 74 and side wall surfaces 75 and 76 which extend upwardly from the bottom surface 74 at right angles thereto. At least one of the walls 75 and 76 is provided by a series of closely spaced recesses, which are preferably arcuate in cross section so as to provide for a fluted effect for a substantial distance therealong. As shown in FIGS. 6 and 7, both walls 75 and 76 are fluted by having a series of opposed recesses 77 extending along a length of the channel 73. As shown in FIG. 6, there are fluted sections at both ends of FIG. 6 which will allow for the axial adjustment of both of the wheels 31 and 32 as will become more apparent below. The shaft also has a series of indents 80 (FIG. 7) extending therealong, one indent 80 being provided for each recess 77 in the channel 73. The series of indents 80 are spaced circumferentially from the channel 73, and in the embodiment shown, the indents 80 are diametrically opposed to the channel 73.

The hub mounting assembly 72 includes a hub member 81 mounted on a sleeve 82 having a central bore 79 with a diameter to fit over the shaft 63 with a small clearance. The hub 81 is affixed to sleeve 82, such as by welding, so as to prevent axial and circumferential movement relative thereto. An outer end of the sleeve 82 is threaded to receive an internally threaded nut 83. The buffer wheel 31 has a central bore 84 so as to be mounted on the exterior of the sleeve between the nut 83 and a spacer 85. Thus, as the nut 83 is tightened, the buffer wheel 32 is clamped on the sleeve against rotational and axial movement relative to the sleeve 82.

The hub member 81 is of circular cross section and is provided with a pair of threaded bores 86 and 87 which are shown as being diametrically opposed. The sleeve 82 is provided with a circular opening 90 which is axially aligned with the internally threaded bore 87 and an opening 91 which is axially aligned with the internally threaded bore 86. An externally threaded pin member 92, which may be in the form of a set screw, is threaded into the internally threaded bore 86 and projects through the opening 91 and into the internal bore of the sleeve 82. The diameter of the pin member 92 is slightly less than the width of the channel 73, and the pin member 92 is screwed sufficiently far into the bore 86 so that its inner end projects internally of the sleeve 83 a distance to space the inner end of the pin member slightly above the bottom wall surface 74 of the channel 73 when the sleeve is slid over the shaft 63.

The circular opening 90 is of smaller diameter than the threaded bore 87. A ball 93 is positioned in the bottom of the threaded bore 87 and is forced into the circular opening 91 by a spring 94 which is compressed between the ball 93 and a cap screw 95 threaded into the outer end of threaded bore 87. Thus, a portion of the spherical surface of the ball 93 projects into the interior of the sleeve 82, and the relationship of the diameter of the ball 93 and the indents 80 is such that the ball, which projects through the opening 90, seats in the indents 80. Due to the spring pressure applied to the ball 93, the seating of the ball 93 in an indent 80 provides a resistance against the hub being moved from one ball seating position to the next. The resistance is only sufficient, however, to noticeably lock the hub in each position as it is pushed along the shaft with the inner end of the pin member 92 sliding freely in the channel 73. The pressure for resistance against axial movement of the hub assembly provided by the ball 93 is not sufficiently great, however, to prevent the hub assembly being moved by hand from one position to the next. When the ball 93 is seated in the indent 80, the inner end of the pin member 92 is adjacent one of the recesses 77 in the channel wall.

Figure 10:
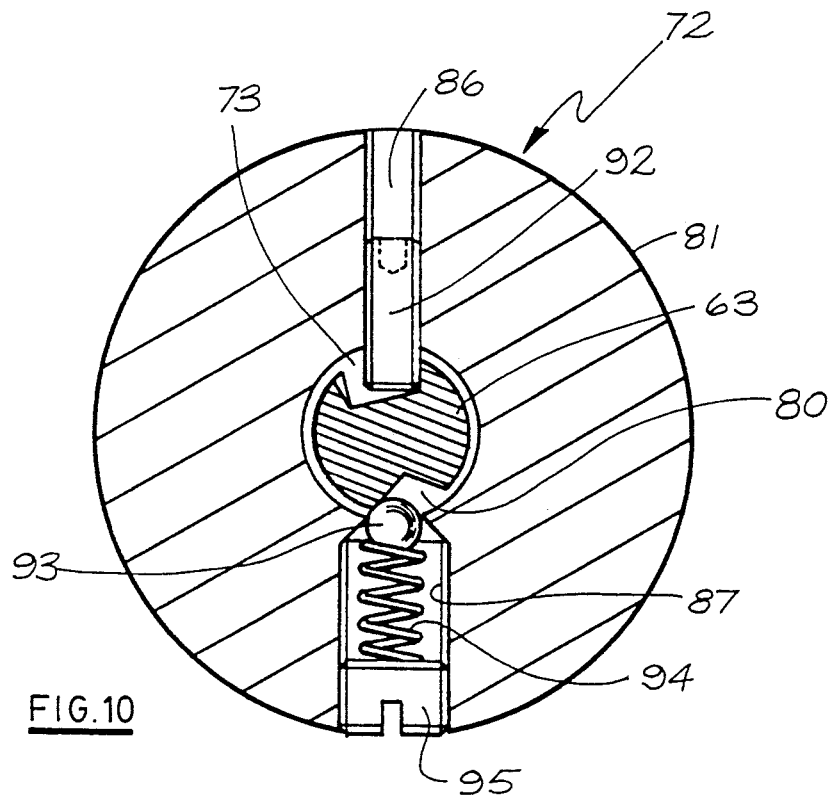
FIG. 10 is a view similar to FIG. 9 but showing the relationship between the hub assembly and shaft in a driving condition.

Thus, when the motor is started so as to rotate the shaft 63, there is an initial small amount of rotation allowed between the shaft 63 and the hub member 81, as shown in FIG. 10 as the ball 94 moves toward one side of the indent 80. As this happens, the inner end portion of the pin member 92 extending into the channel moves into one of the recesses 77 of the fluted portion of the shaft so that as a torque develops when the buffer wheels commence action on a rim, a strong resistance against axial movement between the hub assembly and the shaft is developed. The pin member and series of recesses in the channel side wall thus provides an interacting or interlocking means which responds to the transmission of torque to in effect lock the hub to the shaft, and, of course once the inner end of the pin member 92 has seated in the recess 77 in the side wall of the channel, no further rotational movement of the hub assembly relative to the shaft is permitted. When the buffing action is completed and the motor is shut down, there ceases to be any torque being applied between the drive shaft 63 and the hub assembly 72, and therefore, the buffer wheels 31 and 32 may be readily moved towards each other prior to removing the wheel from the rim receiving space 29. When the next wheel is inserted, the hub members are simply grasped by the operators fingers and they are pulled outwardly to be positioned immediately adjacent the rims 39,39. As the wheels are pulled outwardly along the shaft 63, the ball 94 simply rides axially along the shaft and enters each indent 80 as it passes. When each hub member has been moved so that its respective buffer wheel is properly located relative to the wheel being cleaned which has been inserted into the machine, the operator can feel that the hub assembly is in appropriate position. The operator can feel further resistance to any axial movement of the hub assembly when the ball 94 is seated in an appropriate indent 80. Thus, the buffer wheels are positioned for the buffing action of the next rim.

Preferably opposite ends of the shaft 63 are tapered as shown at 96 so as to permit ready mounting of the hub assembly with its respective buffer wheel on the shaft. As the sleeve 82 of the hub assembly is slid over the end of the shaft upon mounting of a buffer wheel on the shaft, the ball member 93 eventually engages the tapered portion 96 so as to force the ball 94 to a retracted position as the inner end of the pin member 92 enters the channel. The ball remains in the retracted position until it reaches the first indent 80 which it will enter. If the hub assembly is to be pushed further, the ball 93 is pushed to the retracted position until it reaches the next indent 80, and so on.

It will be apparent that the above described hub assembly 72 and shaft 63 combination can be used in other installations where it is desired to be able to quickly make an axial adjustment between a member and the shaft on which it is mounted. By providing the fluted effect at both side walls 75 and 76 of the channel 73, the drive between the shaft 63 and the wheel or other member may be in either direction. Also with the hub and shaft combinations illustrated the drive may be from the shaft to the hub, or alternatively, the hub may be the driving member of the combination.

Referring now to the embodiment of the invention shown in FIGS. 11 through 14, it can be seen that the rim cleaning apparatus 20a is provided with means for mounting the device on an upright post 102 of a conventional tire changing machine 100 used for mounting and installing tires on vehicle wheels 33. The machine includes a base portion 101 having a power driven turn table 103 to which the wheel 33 is clamped for rotation with the turn table 103 about the vertical axis of rotation 109 of the turn table. The rim cleaning device 20a includes a clamp means 104 which can be secured to the upright post 102. The clamp means 104 has a pair of lugs 108 which carry a pivot pin 44a for mounting the head assembly mounting plate 43a for pivoting about a vertical axis at its inner end provided by the pivot pin 44a. A head assembly 30a is mounted at an outer end of the mounting plate 43a so that as the mounting plate 43a swivels about the pivot axis of the pin 44a, the head assembly 30a moves in the direction of the arrow F (FIG. 12) whereby the head assembly 30a can be moved so as to bring the buffer wheels 31 and 32 into engagement with the rim 29 of the wheel 33 affixed to the turn table 103 for rotation with the turn table 103 therewith. The mounting plate 43a has a notched portion 115 adjacent its outer end, and within the notch portion there is provided a ridge or tongue 106 extending in the longitudinal direction of the mounting plate along one side of the notched portion. A rectangular shaped adjustment plate number 107 is connected to the mounting plate 43a in the notched portion. The adjustment plate member 107 has a longitudinal groove 110 in one surface thereof adjacent to and extending parallel to one edge of the adjustment plate member 107. The adjustment plate number 107 has a groove 111 in the surface opposite to the groove 110, the groove 111 being of sufficient width to receive the head 114 of a locking bolt 112 extending through a slot 113 which joins the grooves 110 and 111. The locking bolt 112 is threaded into a bore 119 in the mounting plate 43a. Accordingly, adjustment plate member 107 can move longitudinally of the mounting plate 43a, the tongue 106 sliding in the groove 110. A transversely extending plate 116 is affixed to the outer end of the mounting plate 43a by way of screws 117. The plate 116 has an opening 120 therein through which passes a shaft 121 affixed at its inner end to the adjustment plate number 107 and having a threaded outer end. A knurled nut 120 is threaded onto the outer end of the shaft 120 so that when the lock bolt 112 is loosened, the turning of the knurled nut 122 allows the adjustment plate member 107 to move toward the inner end of the mounting plate 43 or pulls its toward the outer end as indicated by the arrow G.

The head assembly includes a member 123 including support member 62a—62a in which the drive shaft 63 of the buffer wheels 31 and 32 is mounted. The member 123 is journalled in a bore 69 in plate 107 for swivel movement by way of shaft 60a. A handle 71a is affixed at its inner end to the member 123 so that the operator may swivel the buffer wheels as previously described. A motor 50a, which may be an air motor or and electric motor is mounted on the mounting plate 43a and has a drive shaft 52a extending through the mounting plate. The drive shaft 52a is provided with a pulley 55a about which a drive belt 65a is and which also encircles drive pulley 64a affixed to the drive shaft 63.

The tension on the drive belt 65a may be adjusted by loosening the locking nut 112 and turning the knurled nut 122 threaded on shaft 121. When the belt has been properly tightened the lock nut 120 is tightened so as to prevent further movement between the adjustment plate number 107 and the mounting plate 43a.

Figure 11:
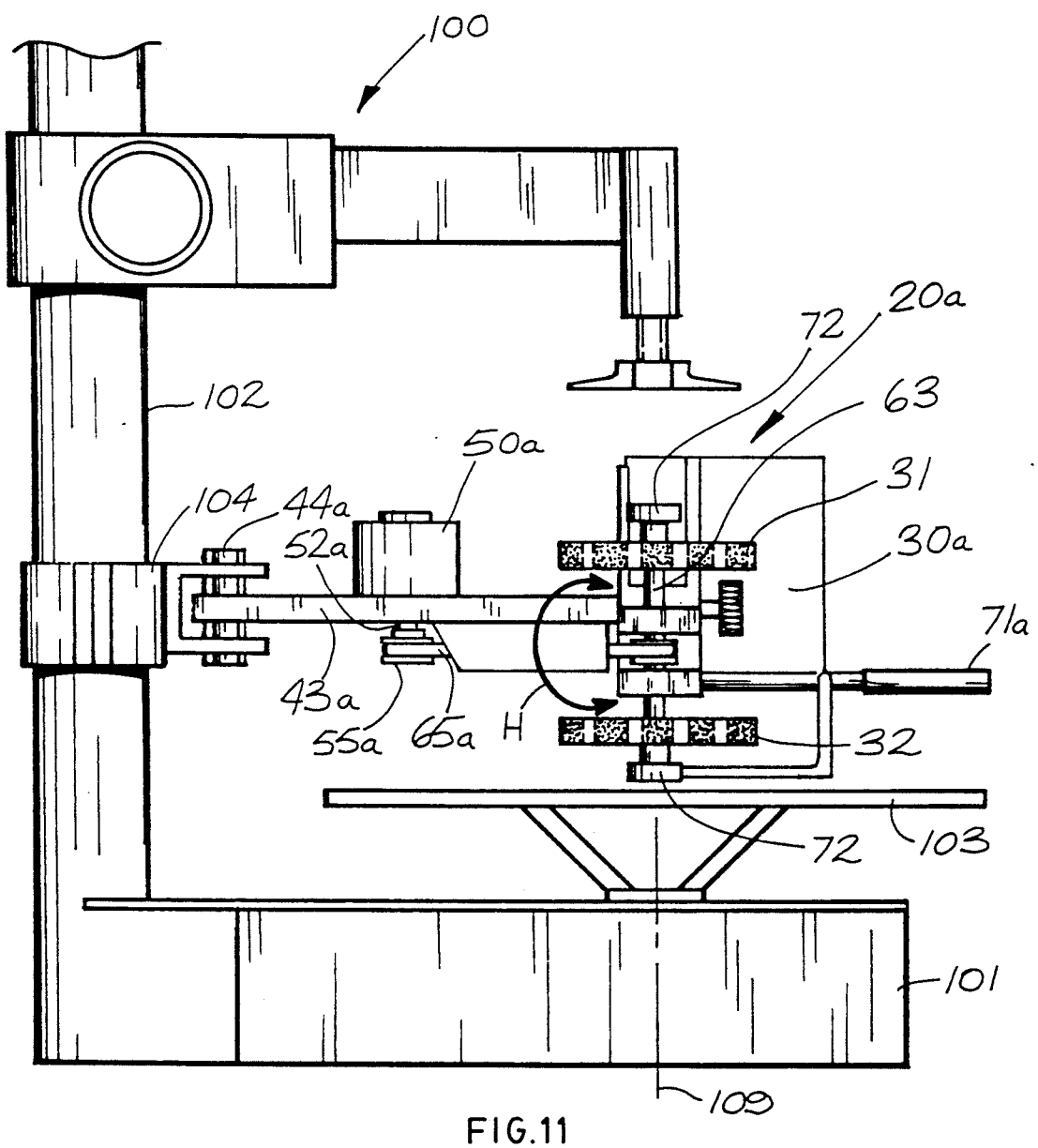
FIG. 11 is a side view of an alternative embodiment of the invention and of a type constructed to mount on a conventional tire changing apparatus.
Figure 12:
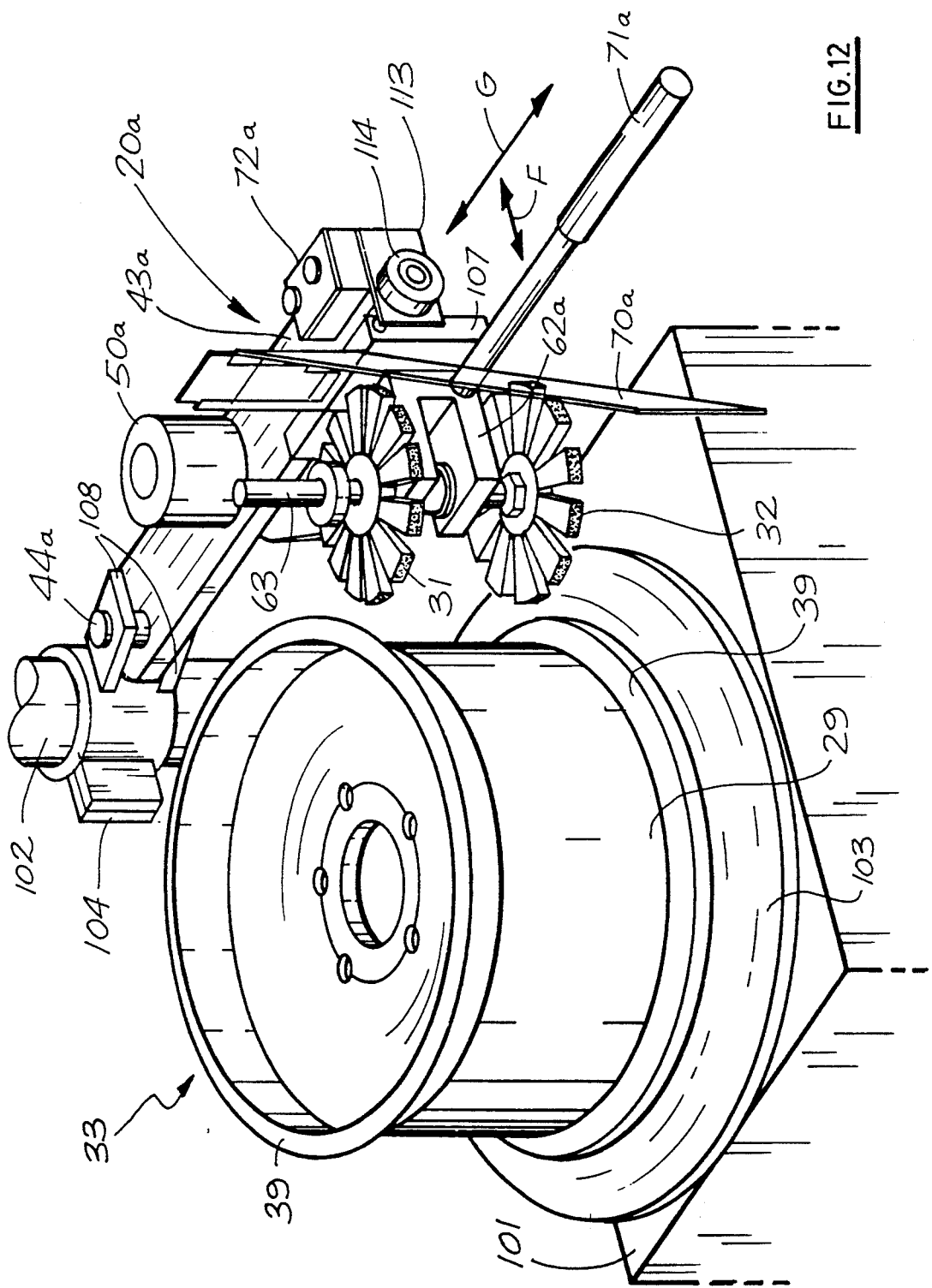
FIG. 12 is a perspective view of the apparatus shown in FIG. 11.

When a wheel 33 has been mounted on the turn table 103, the operator swings the head assembly into a rim engaging position, which movement occurs as the inner end of mounting plate 43 pivots about the vertical axis provided the pin 44a. The buffer wheels 31 and 32 are then moved axially on the drive shaft 63a so as to be positioned immediately within the flanges 39,39 of the rim 29 of the wheel 33. The hub assemblies 72 are as described in connection with FIGS. 5 to 11 above. The motor (not shown) of the tire changing machine 100 is then started to rotate the turn table 103. By actuating the switch 72a provided on the upper outer end portion of the mounting plate 43a, the motor 50a is energized so as to drive the buffer wheels 31 and 32 through belt 65a. As the handle 71, as viewed in FIG. 11, is raised and lowered slightly, the head assembly swivels as indicated by the arrow H so as to cause the buffer wheels 31 and 32 to engage the rims 39,39 as described above in connection with FIG. 4.

In addition to providing a superior and rapid buffing action due to the provision of the pair of buffing wheels on the swivel hit arrangement, the above described embodiments of the invention clearly provide a machine which would be acceptable to mechanics as the wheel may be easily installed in the cleaning portion of the embodiment shown in FIGS. 1 to 4 of the drawings, and in the embodiment shown in FIGS. 11 to 14, the rim may be cleaned in it's installed position in the conventional tire changing machine. Moreover, there are no time consuming adjustments or alterations which require other tools in carrying out the buffing operation. The buffing head assembly can be immediately swung into position by hand, and then one or both buffer wheels may be quickly adjusted by hand to the position which will simultaneously provide optimum buffing to both side flanges and the portions of the rim adjacent to flanges.

Other variations will be apparent to those skilled in the art without departing from the spirit of the invention as defined in the appending claims.

What is claimed is:

1. A buffing device for simultaneously cleaning a pair of axially spaced flanges at the outer rim of a conventional tire receiving vehicle wheel, said device comprising a head means including head mounting means for mounting of said device adjacent a wheel mounting means having means for rotating said wheel about the axis thereof, said head mounting means including an arm member connected at an inner end by a first pivot means to a frame, said head assembly being connected by second pivot means to an outer end of aid arm member, a shaft member of circular cross section mounted in bearing means carried by said head means for rotation about an axis of said shaft member, a pair of buffer wheels mounted on said shaft member, and buffer wheel mounting means for affixing said wheels to said shaft member for rotation therewith and permitting selective adjustment of at least one of said wheels axially along said shaft member to alter the axial spacing of said buffer wheels on said shaft member.

said buffer wheel mounting means including a hub member carrying said at least one wheel, said hub member having an axial bore for longitudinal sliding reception of the shaft member therethrough, and being normally movable axially therealong, and interlocking means between said hub and shaft members for locking said hub member against relative axial movement on said shaft member, said interlocking means being movable to a locking position upon application of torque between said shaft member and said hub member, said interlocking means including a series of axial spaced recesses in one of said hub and shaft members and a detent carried by the other member and movable into one of said recesses on commencement of rotation of said shaft member;

indexing means including a series of axial spaced indents in said shaft member along an axially extending line, said hub member having an indexing member biased radially into said bore and shaped to be received in each indent for providing limited resistance against relative and circumferential movement between said hub member and said shaft member during a non-driving condition said indexing means allowing relative axial manual movement of said hub member along said shaft member while tentatively locating said hub member for reception of said detent in any one of said series of recesses, said interlocking means permitting axial positioning of said hub member along said shaft member and affixing said hub member against both rotation of said hub member and axial movement thereof on said shaft member during driving rotation between said shaft member and said hub member, said first pivot means mounting of said arm member having a pivot axis substantially parallel to the axis of rotation of said vehicle wheel for allowing movement of said head member toward and away from the outer rim of said vehicle wheel, said second pivot means having an axis perpendicular to the axis of said first pivot means for permitting swivel motion of aid shaft member in a plane parallel to the axis of rotation of said vehicle wheel, a wheel drive motor mounted adjacent said head means, drive means connected between said motor means and said shaft member for rotating said shaft member, and manual operable means connected to said head means for manually controlling said swivel motion of said head means whereby said buffer wheels are turned at an angle relative to the flanges on rotatable engagement with inside faces of said flanges of said rim.

2. A device as defined in claim 1, and wherein said interlocking means includes a channel in said shaft member extending axially an extent over which the hub member is axially positionable, said channel being displaced circumferentially about said shaft member from said series of axial spaced indents, said hub member having a rigid detent projecting radially into said bore for sliding reception longitudinally of said channel as said indexing member is moved axially from one indent to the next, said channel being defined by a pair of side walls, at least one side wall of said channel being fluted along the length thereof by way of a series of said recesses having an axial spacing corresponding to the spacing of said indents and shaped to receive said detent upon a slight circumferential shift of said hub member as said shaft member is rotated to transmit a torque therebetween.

3. A device as defined in claim 2, wherein said rigid detent is a pin member of circular cross-section.

4. A device as defined in claim 3, wherein said hub member is provided with a circular opening in said axial bore, and said indexing member includes a ball of greater diameter than said opening, said ball being spring biased into said opening and projecting into said bore.

5. An device as defined in claim 4, and wherein said ball is disposed diametrically opposite to said rigid detent, said series of indents extending along an axial line diametrically opposed to said channel on said shaft member.

6. A device as defined in claim 5, wherein said channel is defined by a bottom surface, said side walls extending upwardly from said bottom wall at substantially right angles thereto and being spaced a distance slightly greater than the diameter of said pin member.

7. An device as defined in claim 6, wherein said recesses are of a concave arcuate shape.

8. An device as defined in claim 7, wherein said hub member includes an elongated sleeve defining said bore, a base member affixed to said sleeve at one end thereof, said sleeve defining said opening, said base member having a threaded bore aligned with said opening and containing said ball, and further comprising a screw threaded into an outer end of said threaded bore and containing a compression spring between an inner surface thereof and said ball for biasing said ball into said opening.

9. An device as defined in claim 8, wherein said base member includes a second threaded bore diametrically opposed to the first threaded bore, and wherein said detent includes a screw received in said second threaded bore and projecting through an opening in said sleeve and into the bore of said sleeve.

10. An device as defined in claim 9, wherein said sleeve is externally threaded at an end opposite to said one end, said buffer wheel mounted on said sleeve member, a tubular spacer of smaller external diameter than said base member encircling said sleeve and spacing said buffer wheel from said base member, and an internally threaded nut screwed onto the externally threaded end of said sleeve and clamping said spacer and said wheel between said nut means and said base member.

11. A device as defined in claim 1, wherein said frame means includes upright side members having floor engaging lower portions and being spaced to provide a wheel receiving space therebetween.

12. A device as defined in claim 11, wherein said wheel mounting means includes wheel supporting rollers located between said lower portions of said side members.

13. A device as defined in claim 12, wherein said roller means includes a pair of transversely extending rollers spaced for engaging a peripheral of the wheel at spaced locations thereof and supporting said wheel for rotation about a substantially horizontal axis.

14. A device as defined in claim 13, wherein said rollers are slightly tilted toward one of said side members and further including a guide roller mounted for rotation about a substantially vertical axis and positioned adjacent said one side member for engaging an outer side of one of the flanges of said rim for positioning said wheel in said wheel receiving space.

15. A device as defined in claim 13, and including drive means between said motor and on of said rollers for turning said one roller to thereby rotate said wheel.

16. A device as defined in claim 13, wherein said first pivot means of said mounting arm member extends between said side members, said first pivot axis being substantial horizontal 17. A device as define in claim 1, wherein said mounting means for said device includes a clamp means for attaching the inner end of said arm member to an upright tool post of a conventional tire changing machine having a wheel turntable for rotating a wheel about a vertical axis, said pivot axis of said first pivot means being substantially vertical.

* * * * *